United States Patent [19]
Brandt

[11] Patent Number: 4,636,909
[45] Date of Patent: Jan. 13, 1987

[54] DIGITAL IMPEDANCE RELAY

[75] Inventor: Nils Brandt, Västerås, Sweden

[73] Assignee: Asea Aktiebolag, Västerås, Sweden

[21] Appl. No.: 696,634

[22] Filed: Jan. 30, 1985

[30] Foreign Application Priority Data

Feb. 1, 1984 [SE] Sweden ................................ 8400499

[51] Int. Cl.$^4$ .............................................. H02H 3/26
[52] U.S. Cl. ...................................... 361/80; 364/483
[58] Field of Search ...................... 361/79, 80, 86, 87, 361/88, 93; 364/482, 483

[56] References Cited

U.S. PATENT DOCUMENTS

| 3,629,658 | 12/1971 | Helge et al. | 361/80 |
| 3,890,544 | 6/1975 | Chanic | 361/80 |
| 4,125,895 | 11/1978 | Buhlmann | 364/483 |
| 4,212,046 | 7/1980 | Andow et al. | 361/80 |
| 4,228,476 | 10/1980 | Okita et al. | 361/483 X |
| 4,321,681 | 3/1982 | Sackin et al. | 361/79 X |
| 4,344,143 | 8/1982 | Kurosawa et al. | 361/80 X |
| 4,371,908 | 2/1983 | Andow et al. | 361/483 X |
| 4,464,698 | 8/1984 | Yoshizaki | 361/79 |
| 4,507,700 | 3/1985 | Andow et al. | 361/80 |

Primary Examiner—A. D. Pellinen
Assistant Examiner—Derek S. Jenning
Attorney, Agent, or Firm—Watson Cole Grindle & Watson

[57] ABSTRACT

A network impedance protection device operates in dependence on the quotient of voltage and current at a measuring point and is set to initiate a protective action when the measured impedance is lower than an impedance level set in the device. Known designs comprise analog components and functions both as regards quotient formation, comparison and compensation etc. An impedance relay constructed according to the invention utilizes the same principles as the analog design, but all units and functions are digitized. Incoming voltage and current signals are converted in an A/D converter, filtered in tuned filters, rectified in rectifiers, and so on, and deliver an output signal, via summators, when the measured impedance is lower than a set impedance value.

6 Claims, 13 Drawing Figures

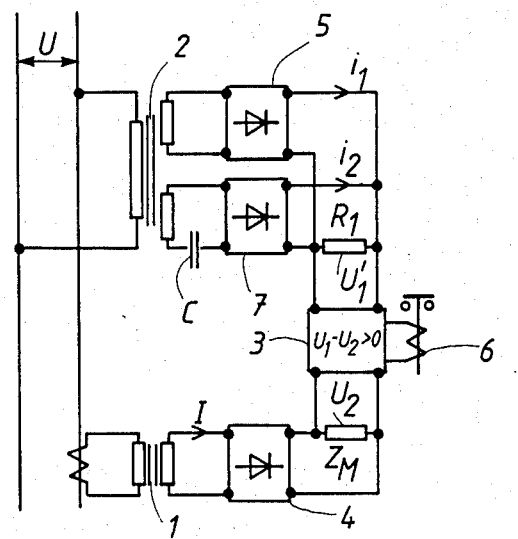
FIG 4
(PRIOR ART)
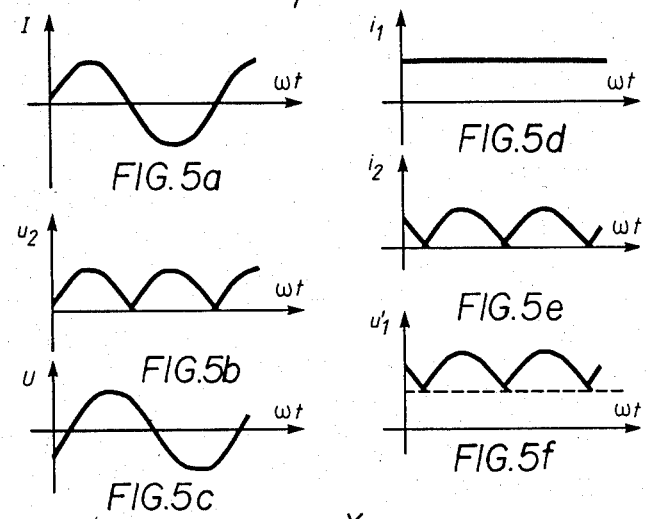
FIG.5a
FIG.5b
FIG.5c
FIG.5d
FIG.5e
FIG.5f
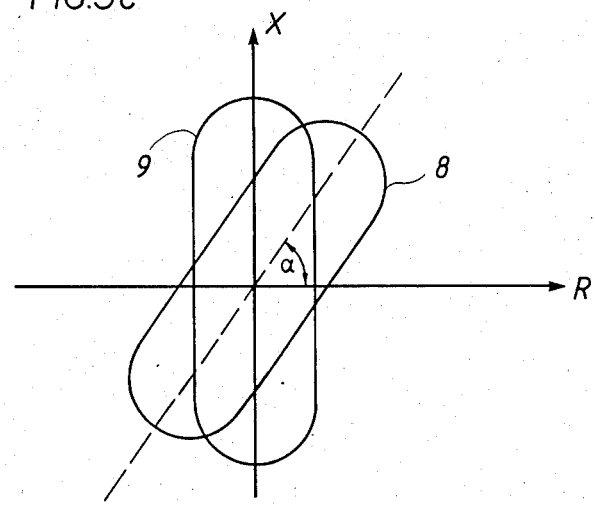
FIG 6
(PRIOR ART)

4,636,909

DIGITAL IMPEDANCE RELAY

TECHNICAL FIELD

Impedance relays are often used for the protection of overhead transmission lines, cables, busbars, and so on, and can also be used to protect transformers, generators and other electrical equipment against short-circuits and ground faults. An impedance protection device operates in dependence on the quotient of the voltage and current at a measuring point. Since the impedance of a power line is directly proportional to the length of the line, the somewhat inappropriate term "distance protection" is sometimes used in place of the term "impedance protection".

In addition to its impedance measuring ability, such protection devices normally also possess several other properties which extend the protective effect. It may, for example, be a question of directional or range properties, but the protection devices may also be used as the starting means for an overcurrent protection device, in a protection device with absolute selectivity, as a protection against oscillations in a network, etc.

For a protection device to have directional properties, implies that it is possible to define the direction of protection located ahead of and behind a measuring point, and that the protection device can determine whether a fault is located ahead of or behind this point. Range properties involve the possibility of determining how far from the measuring point the protective effect shall function.

In principle, an impedance protection device operates in such a way that the impedance at a measuring point, defined as the quotient between measured voltage and current, is compared with a value previously set in the device and that operation of the protection device occurs when the measured impedance becomes lower than the set value.

The present invention relates to a device for digitally detecting an impedance below a set value.

DESCRIPTION OF THE PRIOR ART

An impedance protection device is intended to operate, as previously mentioned, when the measured impedance is lower than the so-called model impedance $Z_M$, that is the impedance set in the device. The criterion for operation is defined with the aid of operating curves of the protection device in an RX plane. FIG. 1 of the accompanying drawings shows such a plane with the load impedance $\overline{Z}_B$ for a network, which is the resultant of all load objects and line impedances connected to the network, when the network system is faultless. The argument for $\overline{Z}_B$ normally lies between $+30°$ and $-30°$.

The vector $\overline{Z}$ shown in FIG. 1 represents the line impedance along the power line in the case of direct ground faults, that is, when the resistance between the line and ground is negligible. However, normally there is a certain resistance at the location of the fault. The vector $\overline{R}_F$ denotes such a fault resistance, which normally consists of arcing resistance and pole grounding resistance.

If a measured impedance lies within the dash-lined region of the RX plane, a fault exists and action must be taken to protect the system against damage. This presupposes that the protection device can discriminate between load and fault impedances. As will be clear from FIG. 1, in the case of an extremely low $\overline{Z}_B$ this may lie within the dash-lined region, the region in which the protection device operates.

In a protection device of the above-mentioned kind, the main interest is not to have a measure of the impedance, that is, to form the quotient between voltage and current at a measuring point. Instead, the formation of criteria and the requirements for operation are transferred into a simpler procedure of comparison. This process will be clear from the following with reference to FIG. 2. In this figure, $U_1$ denotes a voltage proportional to the voltage at the measuring point, and I denotes a current proportional to the current at the measuring point. The requirement for operation, previously made, then implies that when $$(U_1/I) < Z_M$$

then the protection device is required to initiate an action. A transformation of the comparison gives $$0 < IZ_M - U_1$$

which with a suitable dimensioning of a current transformer 1, the impedance $Z_M$ and a voltage transformer 2 shown in FIG. 2 means that the comparison, via rectifiers 4 and 5, can be replaced by a zero detection by means of a zero detector 3. If we set $U_2 = IZ_M$, a protective action is then to be initiated when $U_2 - U_1 > 0$, for example via the relay 6.

The criterion for tripping according to this comparison and using the illustrated method of measuring current and voltage will result in an operating characteristic according to FIG. 3, that is, tripping will arise when the impedance lies within the dash-lined circle. This circular region does not agree very well with the requirement for the region of coverage according to the dash-lined area shown in FIG. 1. However, by means of various more or less complicated compensating circuits, the measuring range can be influenced so as to adapt to the special, and sometimes varying, requirements which exist, for example with regard to overhead transmission lines and cables.

An impedance relay with static components based on the principle of detection described above and with compensating circuits for adaptation of the measuring range is disclosed in the specification of U.S. Pat. No. 3,629,658 of Johansson et al. which is assigned to the assignee of the present application. This protection device is constructed in accordance with conventional analog techniques. A simplified diagram of the device shown in FIG. 1 of U.S. Pat. No. 3,629,658 is reproduced in FIG. 4 of the accompanying drawings. As will be clear, the rectified voltage signal $U_1$ according to FIG. 2 is superimposed by a voltage which is phase-shifted to a certain extent by a capacitor C and a rectifier 7. FIGS. 5a–5f illustrate the current and voltage curves occurring in the circuit shown in FIG. 4 as a function of the angle $\omega t$. The current $i_1$, via rectifier 5, is a smoothed six-pulse rectified current, as will be clear from FIG. 1 of the above-mentioned U.S. patent specification. The current $i_2$ is a non-smoothed current, which is displaced in phase relative to the voltage U. $U_1'$ is the voltage resulting from the flow of the currents $i_1$ and $i_2$ through a resistor $R_1$. The operating characteristic of the relay shown in FIG. 4 will then become oval, as will be clear from curve 8 according to FIG. 6. The inclination $\alpha$ is determined by the value of the capacitor C shown in FIG. 4. In the case of a short-circuited capacitor, the characteristic will be as shown in curve 9 in FIG. 6.

It is generally known that when an alternating voltage is applied to an impedance, for example a transformer or a disconnected line, due to the phase position of the voltage at the moment of switching, a rectified magnetic equalizing flux will arise on which the stationary alternating flux is superposed. In the most unfavourable case, which occurs when switching at the zero passage of the voltage, the equalizing flux will be equal to the peak value of the stationary alternating flux. In practice this may mean that the inrush current for a transformer, upon switching into the high-voltage side, becomes 5-10 times greater than the amplitude value of the rated current and, upon switching to the low-voltage side, 10-20 times greater than the amplitude of the rated current. In protection devices of the impedance protection type, differential protection type, and so on, it is therefore necessary to be able to discriminate between inrush current and short-circuit currents due to faults. It is usually held that a protection device should be stabilized against inrush currents. For stabilization a characteristic difference between inrush and short-circuit currents is utilized, namely that the inrush current has a higher content of even harmonics (particularly the second harmonic component) than a short-circuit current.

As will be clear from the description of the prior art, for example as set out in U.S. Pat. No. 3,629,658, analogically built-up static relays include a relatively large number of components. This means that the space requirement will be relatively great. The analog filters included in the protection devices have their limitations, both in the form of selectivity and in the form of operating speed. The setting of the desired protective function characteristic may be difficult because of the frequency dependence of the components, etc.

SUMMARY OF THE INVENTION

The invention relates to an impedance protection device which, in principle, has the same function as the prior art device described above but with the analog functions digitized. Such digitization results in faster and more accurate measurement of voltages and currents, faster and better filtering of desired quantities, more accurate and simpler setting of the region of protective operation, a considerable reduction in space requirement, and a less expensive design.

BRIEF DESCRIPTION OF THE DRAWINGS

The six figures already referred to will be detailed along with two embodiments in accordance with the invention, in the accompanying drawings, in which:

FIG. 4 shows a circuit for achieving an oval operating characteristic, FIGS. 5a-5f show current and voltage curves for the quantities stated in FIG. 4, and FIG. 6 shows oval operating characteristics, all of which Figures have already been discussed.

Figure 7:
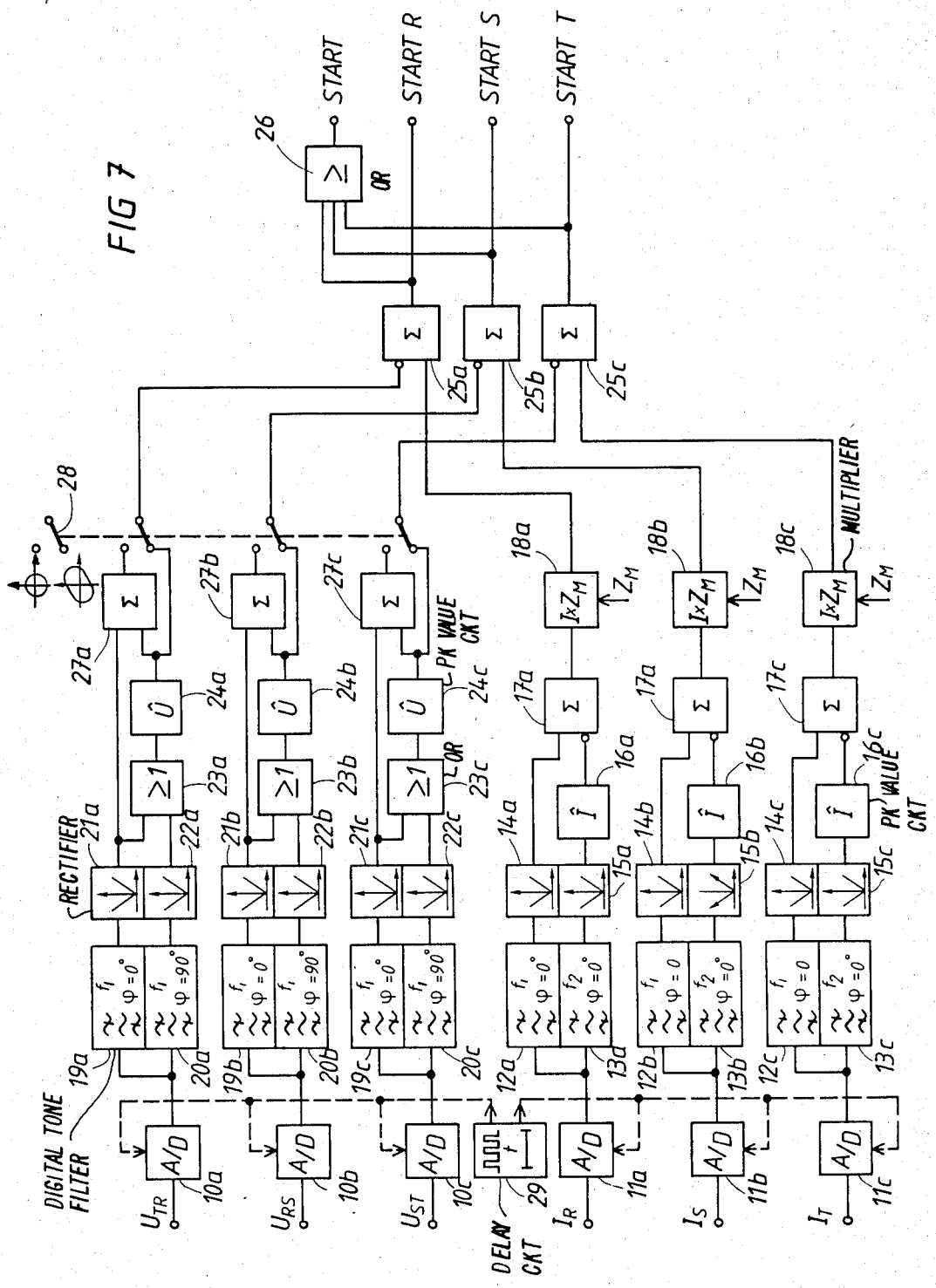
Figure 8:
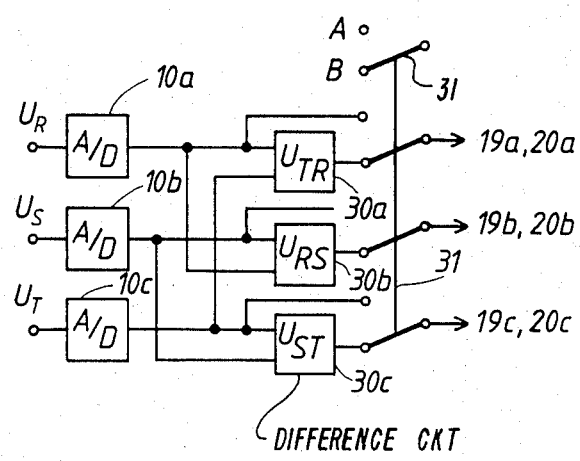

The accompanying drawings also include:

FIG. 7 which shows the construction of one embodiment of a digitally operating impedance protection device according to the invention, and FIG. 8 which shows an alternative input circuit for a second embodiment of protection device.

DESCRIPTION OF THE PREFERRED EMBODIMENTS

A first embodiment of the invention will be described with reference to FIG. 7. It is assumed that voltage input signals $U_{TR}$, $U_{RS}$ and $U_{ST}$ as well as input current signals $I_R$, $I_S$ and $I_T$ have signal and power levels which are adapted to the digital processing that takes place in the device shown in FIG. 7. It is further assumed that output signals "START", "START R", "START S" and "START T" shown in the Figure are supplied to amplifier stages capable of operating a relay and/or a phase selection logic system.

As will be clear from FIG. 7, the voltage signals $U_{TR}$, $U_{RS}$ and $U_{ST}$ are converted from analog signals into corresponding digital values in A/D convertors 10a, 10b and 10c. In the same way, the current signals $I_R$, $I_S$ $I_T$ are converted from analog signals to corresponding digital values in A/D convertors 11a, 11b and 11c.

The digitization means that each analog signal is converted into a pulse train consisting of a certain number of pulses per period and that in this way each sampled value of voltage or current is converted into a binary number for further processing. The sampling frequency is selected having regard to the clock frequency of the chosen system and the desired accuracy in measuring, filtering, and so on.

Further, the current measuring circuits include digital fundamental tone filters 12a, 12b and 12c as well as digital filters 13a, 13b and 13c for the second harmonic component. The filtered values are full-wave recitified, that is, each negative wave is transformed into a positive wave in a rectifier 14a, 14b, 14c and 15a, 15b, 15c, respectively. For the second harmonic component, the peak value is located in a respective peak value circuit 16a, 16b or 16c.

Figure 1:
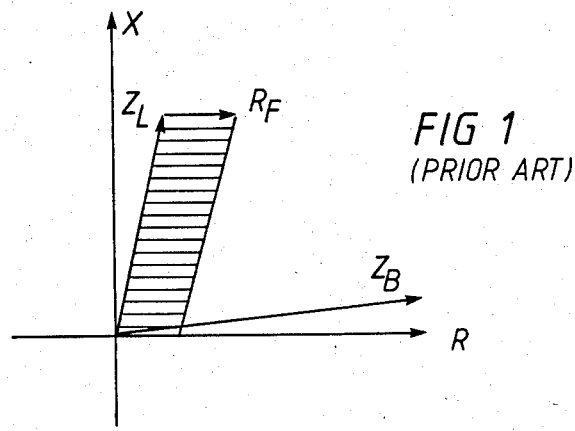
FIG. 1 shows an RX plane with the desired coverage area for an impedance protection device.
Figure 2:
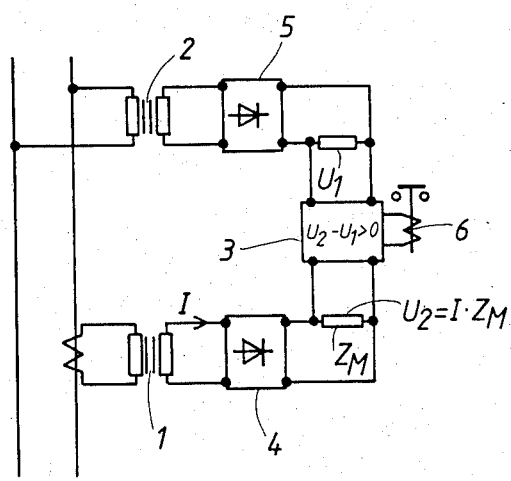
FIG. 2 shows a circuit which, in principle, indicates the mode of operation of the protection device.

When switching in a disconnected line or transformer, as previously mentioned, a very high current with a large proportion of second harmonic content may arise. The value obtained from the peak value circuits 16a, 16b and 16c is then available for stabilizing the relay for such a switching. This is done by subtracting the peak value of the second harmonic component in summators 17a, 17b and 17c from the value assigned to the fundamental tone. The curent values thus stabilized are multiplied in multipliers 18a, 18b and 18c by a settable model impedance $Z_M$. The value after the multipliers corresponds in principle to the voltage $U_2$ in FIG. 2 and in FIG. 4.

The voltage measuring circuit includes fundamental tone filters 19a, 19b, 19c and 20a, 20b, 20c, respectively. From the filters 19a-c, the fundamental tone is obtained in phase with the input signal, and from the filters 20a-c the fundamental tone is obtained with a 90° phase displacement with respect to the input signal. The output signals from the filters then correspond to the sine and cosine parts, respectively, of the fundamental tone. In the same way as described with regard to the current measurements, a full-wave rectification is performed of the filtered values in rectifiers 21a, 21b, 21c and 22a, 22b, 22c, respectively.

Figure 3:
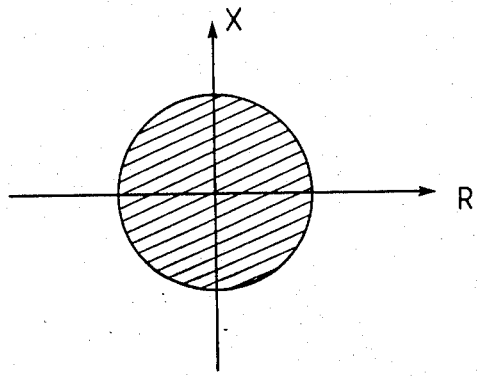
FIG. 3 shows a circular operating characteristic.

As stated previously, a device according to this invention has, in principle, the same function as that described in the specification of U.S. Pat. No. 3,629,658. This means that in order to achieve the circular characteristic shown in FIG. 3, access must be had to a digital value which corresponds to the signal $U_1$ in FIG. 2, or that part of the signal $U_1'$ in FIG. 4 which corresponds to the smoothed current $i_1$. This is accomplished in the circuit of FIG. 7 by forming a sliding mean value, that is, a mean value of a number of consecutively measured peak values where the mean value formation is updated for each new measured peak value. Since both the sine and the cosine part of the fundamental tone and the full-wave rectifier values are the starting-point, a peak value is obtained four times every period. In one embodiment, four measured peak values for the mean value formation are stored. This means that a sliding mean value is formed during one period. The accuracy in the peak value determination is—as mentioned—dependent on the number of samples per period.

The sliding mean value is formed with the aid of OR-elements 23a, 23b, 23c and peak value generators 24a, 24b and 24c.

The criterion formation for operation, that is, for obtaining START output signals, is also performed in this device as a zero detection. When the product of current and the $Z_M$-sample is greater than the sliding mean value of the voltage, operation is obtained via summators 25a, 25b and 25c. As will be clear from FIG. 7 in addition to a direct START signal, a common signal can be obtained for each phase via an OR-element 26 if any of the phases indicates an underimpedance condition.

To be able to form the oval operating characteristic shown in curve 9 in FIG. 6, access must be had to a voltage measuring value corresponding to the voltage $U_1$ according to FIG. 5. This is achieved in a device according to this invention by adding to the sliding mean value in the summators 27a, 27b and 27c, the instantaneous value of the voltage in the form of the digital values of the fundamental tone sample of the voltage, which is obtained via the filters 19a–c and the rectifiers 21a–c. Switching between circular and oval characteristics is performed by means of a switch 28.

To cause the major axis of the oval operating characteristic to coincide with the X-axis in the impedance plane, it is assumed that the current and voltage samples are synchronized, that is, that they are taken up at the same time. To cause a certain inclination $\alpha$ of the major axis as shown in curve 8 of FIG. 6, the voltage sample is displaced in relation to the current sample. The time displacement can take place in a number of different ways. In one embodiment, the voltage sample can be delayed relative to the current sample, and this can be effected with a member 29 in FIG. 7.

If, for example, there are eight samples per period, a displacement of one whole sample results in a rotation corresponding to $\alpha=45°$. To obtain an inclination $\alpha=70°$, the voltage sample must lag 20° behind the current sample, which in the case of eight samples per period corresponds to (20/360) 0.20=1.111 ms. By varying the point in time between taking up voltage and current samples, different inclinations of the major axis—and thus of the oval characteristics—can be obtained in this way.

For an impedance protection device of this type to have a satisfactory operation, certain secondary functions are required. For example, it is desirable to be able to influence the return value of the impedance protection device in such a way that this value becomes somewhat higher than the operating value. This can take place, for example, in a simple manner by switching a hysteresis-forming element into the respective START function.

To obtain a stable and calm operation, a time-delay element can be connected into the START circuits in order to cause a possible operation to remain during a fixed and settable period of time.

Sometimes there may be a desire to prevent protective action if the measured current is lower than a preset value. This can suitably take place by connecting $I_{min}$-elements between respective elements 17a–c and 18a–c.

A complete protection device normally also includes facilities for certain test functions which, on the one hand, initiate the input stages so that a START signal is obtained in a selected phase and, on the other hand, generate a blocking signal.

It is also very common to make use of the properties of the protection device for supplementary functions.

Since current measurement is included, it is very simple to utilize this measurement for overcurrent start at a current corresponding to a desired number times the rated current.

It is simple to supplement such an impedance protection device with a function for zero sequence current. Current measurement, A/D conversion, etc., then take place in the same way as for the impedance protection function. At zero sequence current, the voltage measuring circuit is switched for phase voltage measurement. An alternative input circuit to the impedance relay, which also covers the case with operation for zero sequence current, is shown in FIG. 8. The phase voltages $U_R$, $U_S$ and $U_T$ are here fed to the A/D convertors 10a, 10b and 10c. When a switch 31 is switched to its upper position A, the phase voltages are measured. The main voltages $U_{TR}$, $U_{RS}$ and $U_{ST}$ are now formed in circuits 30a, 30b and 30c as the difference voltages between the actual phase and the preceding phase by taking the difference between the samples in question in the two phases which constitute the main voltage. When the switch 31 is in the position shown at B, the main voltages $U_{TR}$, $U_{RS}$ and $U_{ST}$ are passed to the filters 19a–c and 20a–c.

The device described in the foregoing can be modified in many ways with a higher or lower degree of integration of main, secondary and supplementary functions, and all such modifications falling within the scope of the following claims constitute part of the present invention.

What is claimed is:

1. A protection device of the impedance measuring type for a multiphase system, comprising:

A/D conversion means for generating digital pulse trains representative of the respective phase voltages and currents within said system at least at one measuring point;

voltage circuit means responsive to the voltage digital pulse train for each phase of said system and including means for producing signals representative of the instantaneous value of each of said voltage pulse trains, means for generating a digital mean value corresponding to the mean value of each phase voltage, and summator means for determining the difference between said digital mean value and the instantaneous value of each said phase voltage;

current circuit means responsive to each current digital train for each phase of the system and including means for generating signals respectively representing the fundamental and second harmonic frequencies of said phase current, means for determining the peak value of said second harmonic frequency signal, first summator means for determining the difference between said peak value and said fundamental frequency signal to produce a difference signal, means for multiplying said difference signal by a representative model impedance to produce a difference voltage output; and second summator means for determining the difference between the difference voltage outputs of said voltage circuit and said current circuit for each phase of the system to generate relay control signals for each phase of said system.

2. The protection device according to claim 1 further comprising means for introducing a time lag delay of each of the digital pulse trains representative of the voltage of each phase with respect to each of the digital pulse trains representative of the current of each phase of the system.

3. The protection device according to claim 2 wherein said means for producing signals includes means for generating signals respectively representative of the sine and cosine of said voltage pulse trains, said signal representative of the sine representing said instantaneous value of the voltage pulse train and said means for generating a digital value receives said cosine voltage signal, said digital mean value being formed as a mean value of a number of consecutively measured peak values and the mean value formation being updated for each new measured peak value.

4. The protective device according to claim 3 wherein said means for generating said sine and cosine voltage signals are respective digital tone filters and means for rectifying the respective output of said digital tone filters.

5. The protective device according to claim 2 and further comprising means for determining the difference between a present measured phase voltage and an immediately preceding phase voltage as the voltage at least at one said measuring point.

6. The protective device according to claim 2 further comprising switching means having a first position for providing said difference signal to said second summator means and a second position for providing the instantaneous volt-digital mean value of each phase voltage to said second summator means.

* * * * *